June 10, 1930.  P. W. LEHMAN  1,762,825
TIRE BUILDING MACHINE
Filed March 28, 1928  3 Sheets-Sheet 1
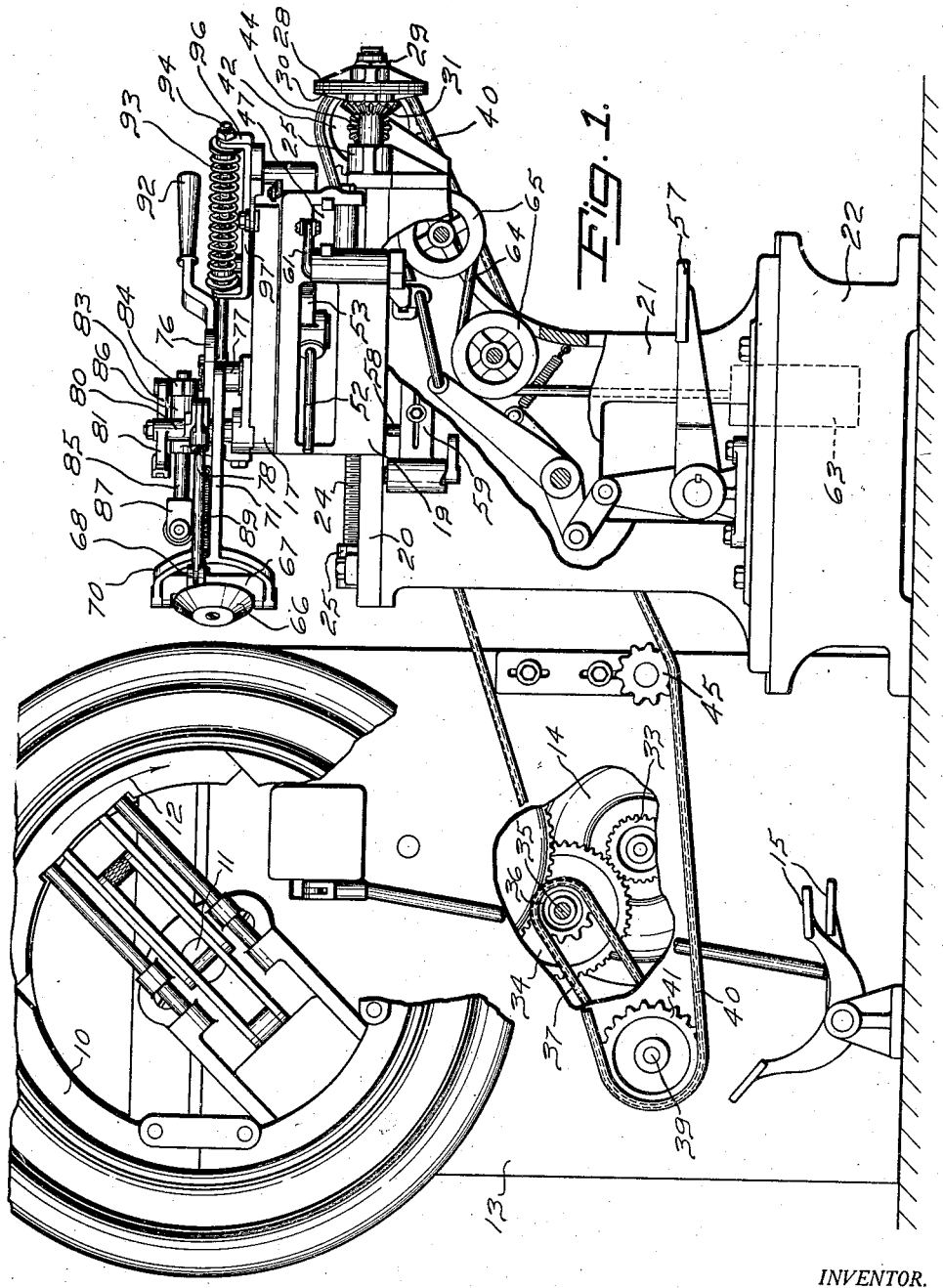
INVENTOR.
PAUL W. LEHMAN.
BY
ATTORNEY.

June 10, 1930.   P. W. LEHMAN   1,762,825
TIRE BUILDING MACHINE
Filed March 28, 1928   3 Sheets-Sheet 2
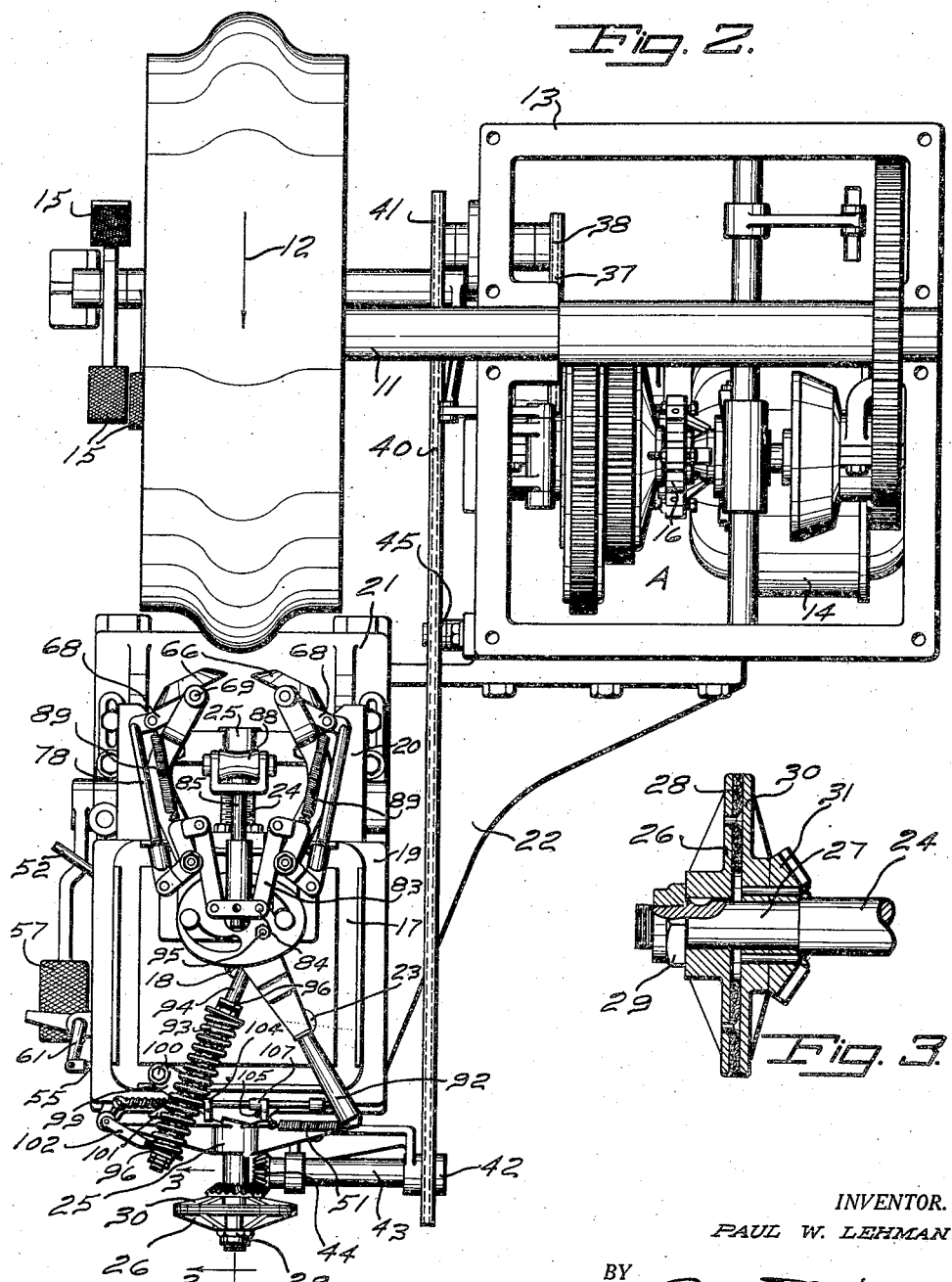
INVENTOR.
PAUL W. LEHMAN.
BY
ATTORNEY.

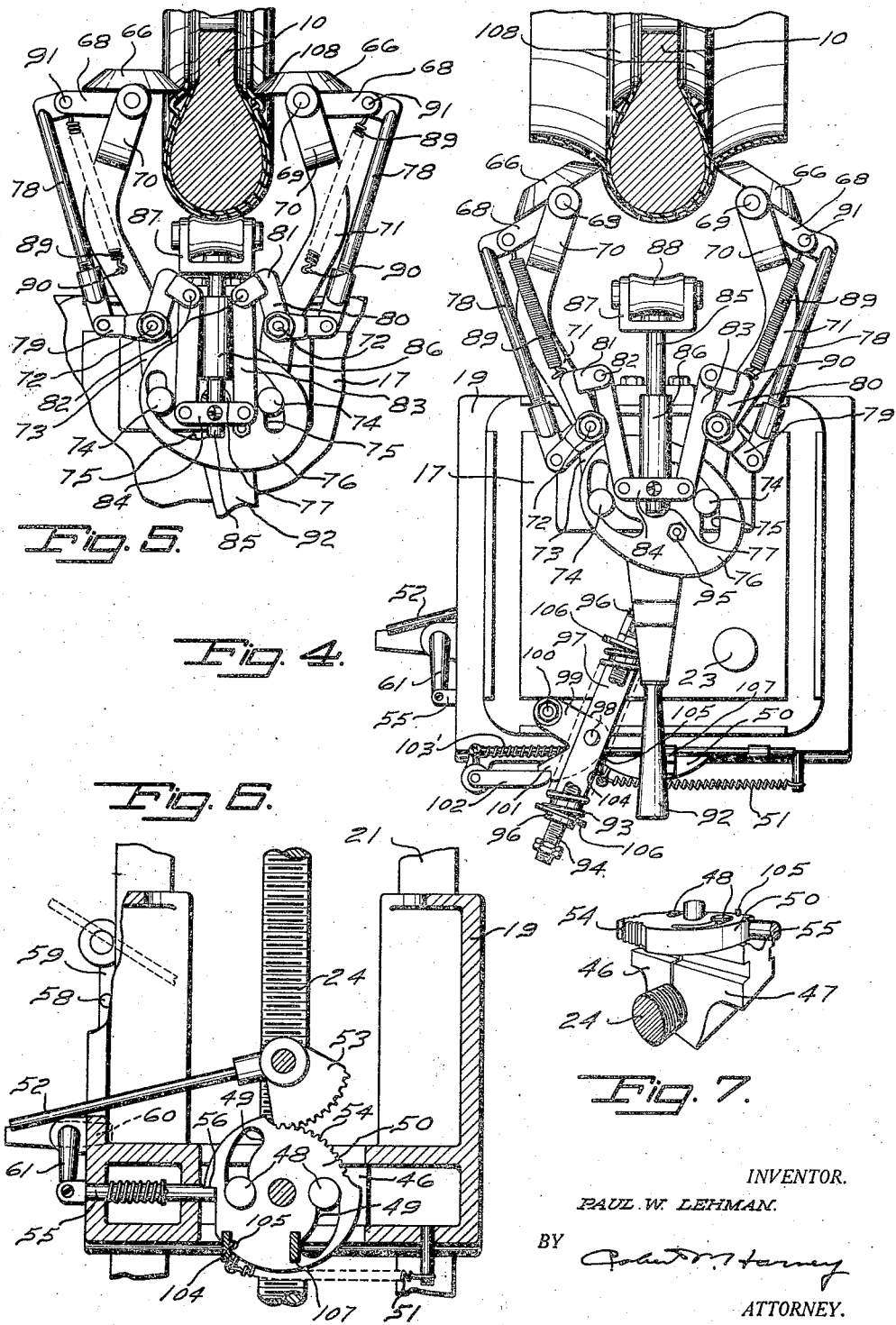

Patented June 10, 1930

1,762,825

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE-BUILDING MACHINE

Application filed March 28, 1928. Serial No. 265,480.

My invention relates to a machine for building pneumatic tires and particularly to that part of the machine for stitching down the various plies of fabric of which the casing is built. The objects of my invention will be found in the following specification and claims in which Fig. 1 is a side elevation of the machine, partially broken away, showing a tire building machine together with a stitching mechanism made in accordance with my invention;

Fig. 2 is a plan view of Fig. 1;

Fig. 3 is a view taken on line 3—3 of Fig. 2;

Fig. 4 is a plan view of the building portion of the machine showing the initial operation of stitchers;

Fig. 5 is a view similar to Fig. 4 but showing the stitchers advanced almost to their limit;

Fig. 6 is a detail of the carriage moving mechanism; and

Fig. 7 is a perspective view of a portion of the carriage moving mechanism.

In the drawings, a core 10 upon which pneumatic carcasses are built is mounted on a spindle 11 rotated in the direction of arrow 12 through mechanism A within a housing 13. This mechanism A is driven from a motor 14 also located within the housing. The rotation of the core 10 is controlled by means of pedals 15 operating a clutch 16 forming part of the mechanism A.

A turntable 17 carrying stitching mechanism and any other mechanism that may be desired is located as best shown in Figs. 1 and 2. The turntable 17 is pivoted about a pin 18 on a carriage 19 slidably mounted on a pair of ways 20 on a frame 21. This frame is adjustably fixed to another frame 22 fastened to the side of the housing 13. The turntable 17 may be locked in the desired position on the carriage 19 by a pin 23 in the turntable fitting through apertures in the top of the carriage 19.

A screw 24, mounted in a pair of bearings 25 on the frame 21, has a disk 26 keyed to a reduced portion 27 on the end of the screw (Fig. 3). Friction material 28 is riveted to the disk 26 and ordinarily presses, by means of a nut 29, against another disk 30 fixed to a beveled gear 31. The pressure exerted by the nut 29 is such that when the carriage 19 is under ordinary load the disks 26 and 30 will be locked together and cause the carriage to be moved forward.

The beveled gear 31 is rotated indirectly from the same motor that drives the mechanism A. The motor 14 is equipped with a driving gear 33 (see Fig. 1) meshing with a gear 34 on an intermediate shaft 35, this shaft also carrying a sprocket 36. A chain 37 travels over the sprocket 36 and around a sprocket 38 (see Fig. 2) on a jack-shaft 39 thereby driving a chain 40 traveling around a second sprocket 41 on the shaft 39 and a sprocket 42 on one end of a shaft 43 carrying at its other end a beveled gear 44 meshing with gear 31. An adjustable sprocket 45 on the housing 13 is adapted to take up any slack in the chain 40. It will be evident that the screw 24 will turn when the motor is started.

A screw 24 is used to propel the carriage 19 toward the core when the stitching mechanism is functioning. However, as the screw ordinarily is constantly turning as explained above and as the attached mechanism is only used intermittently, it is necessary to provide mechanism for locking and unlocking the carriage to the screw. For this purpose I have provided a pair of blocks 46 and 47 slidably mounted in the carriage 19 and presenting, when brought together as shown in Figs. 6 and 7, a threaded bore meshing with the threads of screw 24. These two blocks 46 and 47 are brought into mesh with the screw by pins 48 rigidly fixed in the blocks and riding in a pair of cam slots 49 in a cam 50. This cam, ordinarily held by a spring 51 in inoperative position, i. e., with the blocks 46 and 47 out of mesh with the screw, is moved into operative position, as shown in Figs. 6 and 7, by a rod 52 operating a gear segment 53 meshing with a series of teeth 54 on the cam 50. A spring pressed latch 55 catches against a shoulder 56 of a slabbed-off portion on the cam, thereby holding the blocks 46 and 47 in meshing position. The carriage 19 may also be drawn toward the core 10 by a foot treadle 57 and its associated linkage, but as this specific structure does not form a part of the invention it will not be described in detail.

After the carriage 19 has been fed toward the core 10 a predetermined distance, a stop pin 58 in an adjustable block 59 mounted on the side of the frame 21 strikes against one arm 60 of a bell crank 61 connected to the outer end of latch 55, thereby causing the unhooking of the latch and allowing the spring 51 to draw the cam 50 again in inoperative position. This return of the cam also causes the return of the rod 52 into the position shown in dotted lines in Fig. 6.

Through the action of a weight 63 attached by a cable 64, traveling about pulleys 65 to the carriage 19 the said carriage will be brought back to its inoperative position at the unlocking of the blocks 46 and 47.

The stitching mechanism comprises a pair of stitchers 66 mounted in bearings 67 pivoting about pins 69. The pins 69 are fixed in yoke ends 70 of arms 71 pivoting about bolts 72 on the turntable 17, the said arms 71 having rearwardly extending portions 73 carrying pins 74 projecting into cam slots 75 in a cam plate 76 pivoted to the turntable at 77. The bearings 67 have arms 68 connected by adjustable links 78 to arms 79 of bell cranks 80, said bell cranks being also pivoted about the bolts 72. The other arms 81 of the bell cranks 80 are pivoted at 82 to one end of a pair of links 83, the other ends of which are pivoted to a tie piece 84 adjustably fixed to one end of a shaft 85, said shaft slidably fitted through a bearing 86. On the other end of the shaft 85 is fixed a yoke 87 carrying a small roller 88 adaptable to engage the core 10. Tension springs 89 between hooks 90 in the arms 71 and pivots 91 tend to hold the stitchers 66 at the angle shown in Fig. 2, and incidentally to urge arms 71 into the position shown in the latter figure.

In operation the stitchers 66 are normally pressed toward each other by a relatively heavy compression spring 93 fitted at its ends with shouldered washers 106. This spring is held in place over a rod 94 pivotally attached to the cam plate 76 at 95 and adjustably fitted through the upturned edges 96 of a bracket 97 which is in turn pivoted at 98 to a link 99 pivoted about a bolt 100 in the turntable 17. A handle 92, fitted to or made in one piece with the cam plate 72 is used to increase the distance between the stitchers 66 at the start of the operation if found desirable.

The link 99, normally free to pivot about the bolt 100, allows the unit including the rod 94, bracket 97, and spring 93 to function as one piece, the only pressure on the stitchers 66 then being the slight pressure caused by the springs 89. By holding the link 99 fixed in one position, the spring 93 may be used to press the stitchers toward each other. For this purpose, I have provided the link 99 with a hook 101 for receiving a latch 102 actuated by a rod 103. Slidably mounted on the rod 103 is a stop piece 104 retained by a spring 104' which is adapted to exert a yieldable latching pressure on the latch when the stop piece 104 is engaged by a pin 105 in the cam plate 50 when the said cam plate is rotated to lock the blocks 46 and 47 about the screw 24. Keeping the link fixed prevents the bracket 97 from moving in line with the rod 94 but allows the rod to slide through the bracket and compress the spring 93 which increases the pressure of the stitchers 66 on the core 10.

Although the pivoting of the arms 71 about the bolts 72 as the stitchers 66 ride upon the curved surface of the core 10 will cause the stitchers to change their angle of contact slightly, a more abrupt change in this angle is caused by the links 78 and arms 68 and 79. After the carriage 19 has been fed toward the core 10 a predetermined distance, the roller 88 will be forced against the core and will gradually carry the tie piece 84 away from the bearing 86. This will draw the links 83 toward each other turning the bell cranks 80 about the pivots 72, and, through the adjustable links 78 and arms 68, turn the bearings 67 about the pins 69, thus causing the stitchers 66, carried by the bearings 67 to change their angle.

The operation of the machine is as follows: A pocket or length of tire fabric made up of one or more plies of material is stretched, or otherwise placed over, and centralized upon, the core 10 in any suitable manner. With the fabric on the core and the turntable in the position shown in the drawings, the operator starts the core rotating by stepping on the clutch pedal 15, and throws the rod 52 forward thereby locking the carriage to the rotating screw 24 and locking the link 102 in position. The lever 92 is then drawn to the left, if desirable, enough to start the stitchers down the side of the core as shown in Fig. 4. The operator is now free to leave the machine, to get material for subsequent operations for example, and the stitchers will be fed automatically down around the core, laying the fabric smoothly against the side of the core under the pressure of spring 93, the angle of the stitchers changing as already described. After the carriage has moved its predetermined distance the pin 58 will unlatch the cam 50, causing the unlocking of the blocks 46 and 47, allowing the weight 68 to bring the carriage back to its starting position.

Unlatching the cam 50 and allowing the spring 51 to bring the said cam back to its inoperative position will cause the pin 105 on the cam to engage a second stop-piece 107 on the rod 103 which also carries the stop-piece 104. Moving the piece 107 to the right will unlock the latch 102 thereby releasing the pressure of the spring 93 on the cam 76 and consequently on the stitchers 66. As already described, the springs 89 will bring the stitchers into the position as shown in Fig. 2.

In case the operator desires to stitch the fabric at some particular portion of the casing and does not find it necessary to stitch over the entire core, he may move the carriage 19 toward the core by stepping on the treadle 57 and press the stitchers against the core by the use of handle 92.

After tire beads 108 are placed in position on the stitched down fabric, additional plies of material may be stitched over the first plies and the said beads by repeating the above operation, the stitchers moving about the beads as shown in Fig. 5. Upon the completion of the stitching operations, the turntable may be pivoted to one of its other positions and allow other tire building mechanism, not shown in the drawings, to be used.

Although the drawings show the tire being built with beads known as the clincher bead, the stitchers may be used equally as well with wire beads.

Having thus described my invention, I claim:

1. A tire building machine comprising a rotatable core, a stitcher carriage, stitching mechanism mounted thereon including pivoted arms provided at their free ends with pivoted bearings, stitching discs mounted in said bearings, a yielding member mounted on the carriage and positioned to engage the crown of the core only after the stitching discs have advanced a predetermined distance down the sides of the core and links connecting the pivoted bearings of the stitching discs and the yielding member to cause a change in the angle of the discs with respect to the core during the travel of the discs over the bead portion of the core.

2. A tire building machine comprising a rotatable building core, a stitcher carriage, stitching mechanism mounted thereon including pivoted arms provided at their free ends with pivoted bearings, stitching discs mounted in said bearings, releasable spring actuated means adapted to urge said arms and the discs carried thereby toward each other and the sides of the building core, a yielding member mounted on the carriage and positioned to engage the crown of the building core only after the stitching discs have advanced a predetermined distance down the sides of the core, links connecting the pivoted bearings of the stitching discs and the yielding member to cause a change in the angle of the discs with respect to the core upon the continued advance of the carriage and means automatically operative upon the completion of the stitching operation to release said spring actuated means.

3. In a tire building machine, a change angle stitching mechanism, a roller positioned in the plane of rotation of the core and adapted to engage the crown of the core after the stitchers have advanced down the sidewalls of the core, and means operatively connecting the roller to the stitching mechanism to change the angle of the stitchers as the latter advance over the bead portion of the core.

4. A tire building machine comprising a rotatable building core, a stitcher carriage, stitcher mechanism mounted thereon, releasable spring actuated means adapted to urge the stitcher into engagement with the core, means to automatically advance the stitcher carriage toward the core and means automatically operative upon completion of the stitching operation to release said spring actuated means and to retract the carriage from the core.

PAUL W. LEHMAN.